(12) United States Patent
Huang

(10) Patent No.: US 8,246,197 B2
(45) Date of Patent: Aug. 21, 2012

(54) LENS, LENS ARRAY HAVING SAME AND LIGHT SOURCE MODULE HAVING SAME

(75) Inventor: Shan-Fu Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 476 days.

(21) Appl. No.: 12/504,803

(22) Filed: Jul. 17, 2009

(65) Prior Publication Data

US 2010/0142200 A1    Jun. 10, 2010

(30) Foreign Application Priority Data

Dec. 5, 2008    (CN) .......................... 2008 1 0305978

(51) Int. Cl.
*F21V 1/00* (2006.01)
*F21V 11/00* (2006.01)

(52) U.S. Cl. ........ 362/235; 362/245; 362/244; 362/327; 385/33

(58) Field of Classification Search .................. 362/235, 362/555, 219, 227, 230, 231, 236, 237, 238, 362/240, 249.01, 249.02, 268, 310, 335, 362/336, 215, 169, 245, 244, 327; 359/642–830; 385/31, 33, 34, 35, 47, 129, 130, 131, 132, 385/146

See application file for complete search history.

(56) References Cited

U.S. PATENT DOCUMENTS

| 6,724,543 | B1 * | 4/2004 | Chinniah et al. | 359/718 |
| 7,160,522 | B2 * | 1/2007 | Dominguez et al. | 422/186.3 |
| 7,270,454 | B2 * | 9/2007 | Amano | 362/522 |
| 7,837,349 | B2 * | 11/2010 | Chinniah et al. | 362/244 |
| 7,837,359 | B2 * | 11/2010 | Danek et al. | 362/309 |

* cited by examiner

*Primary Examiner* — Anabel Ton
*Assistant Examiner* — Danielle Allen
(74) *Attorney, Agent, or Firm* — Altis Law Group, Inc.

(57) ABSTRACT

An exemplary lens includes a first light incident surface, a second light incident surface, a reflecting surface, a first light emitting surface and a second light emitting surface. The second light incident surface is connected with the first light incident surface. The first and the second light incident surfaces cooperatively define a receiving space therebetween. The receiving space is configured for accommodating the point light source. The reflecting surface is connected with the second light emitting surface. The first light emitting surface is opposite to the first light incident surface. Light entering the lens through the first light incident surface exits from the first light emitting surface. The second light emitting surface is connected between the first light emitting surface and the reflecting surface. Light entering the lens through second light incident surface is reflected from the reflecting surface to the second light emitting surface to exit the lens.

9 Claims, 7 Drawing Sheets

LENS, LENS ARRAY HAVING SAME AND LIGHT SOURCE MODULE HAVING SAME

BACKGROUND

1. Technical Field

The present disclosure relates to a lens, a lens array having the lens, and a light source module having the lens.

2. Description of Related Art

A light emitting diode (LED) emits light, thus forming a light field. Usually, a central portion of the light field has higher brightness than a peripheral portion of the light field surrounding the central portion. When the LED is directly coupled to a light guide plate to form a light source module, light emitted from the LED enters the light guide plate and exits from a light emitting surface of the light guide plate. Since the brightness of the light field formed by the LED is not uniform, brightness of the light emitting surface of the light guide plate may also be not uniform.

Therefore, a new light source module is desired to overcome the above-mentioned problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
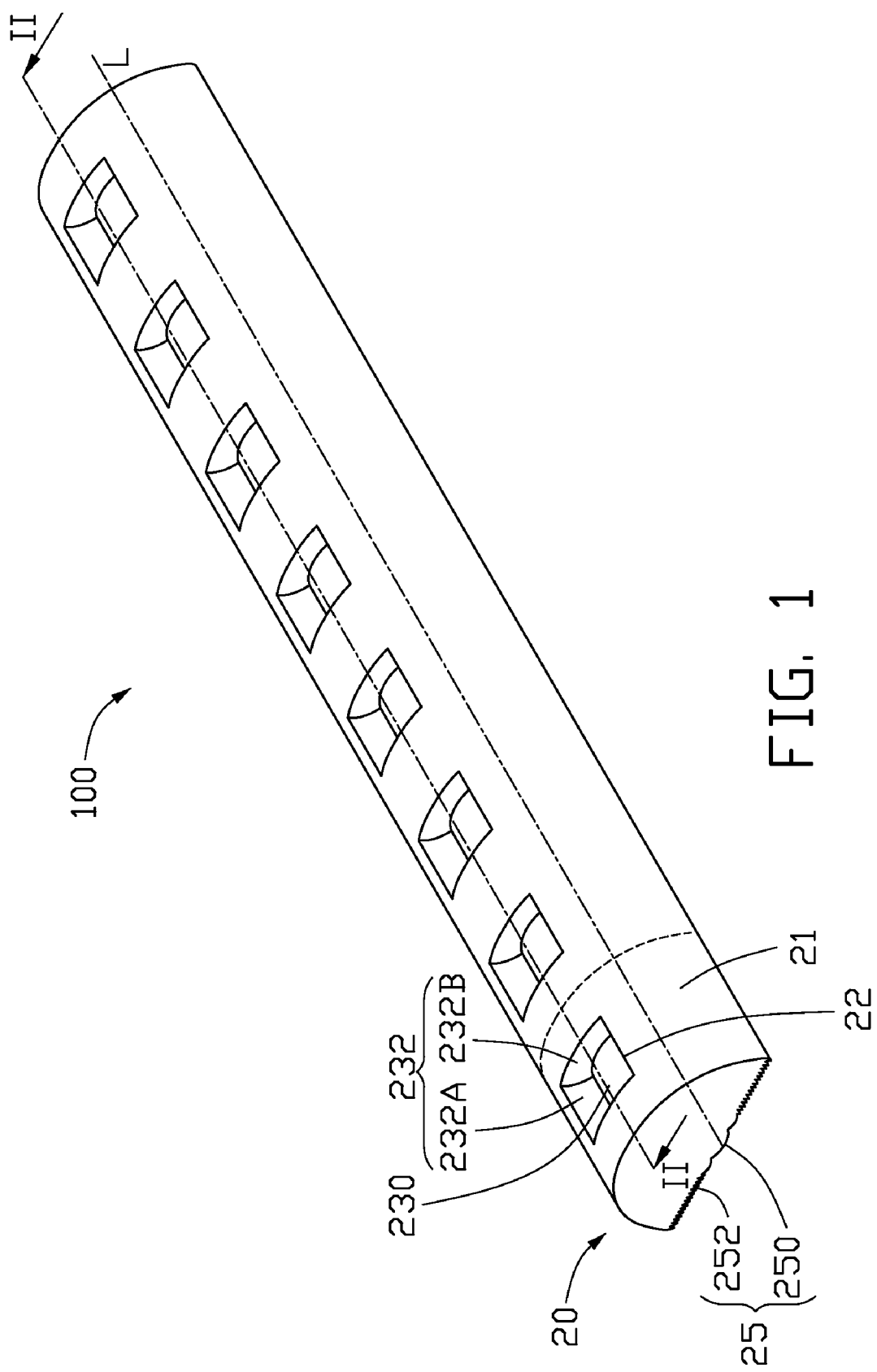
FIG. 1 is a perspective view of a lens array according to a first embodiment.
Figure 2:
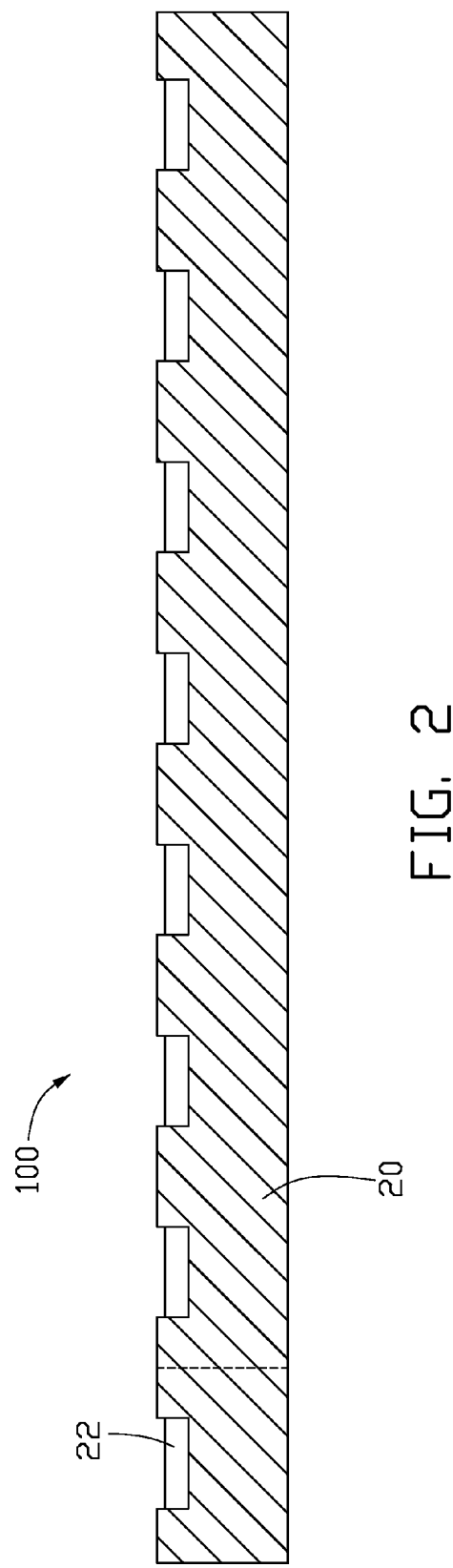
FIG. 2 is a cross-sectional view of the lens array of FIG. 1 taken along the line II thereof.
Figure 3:
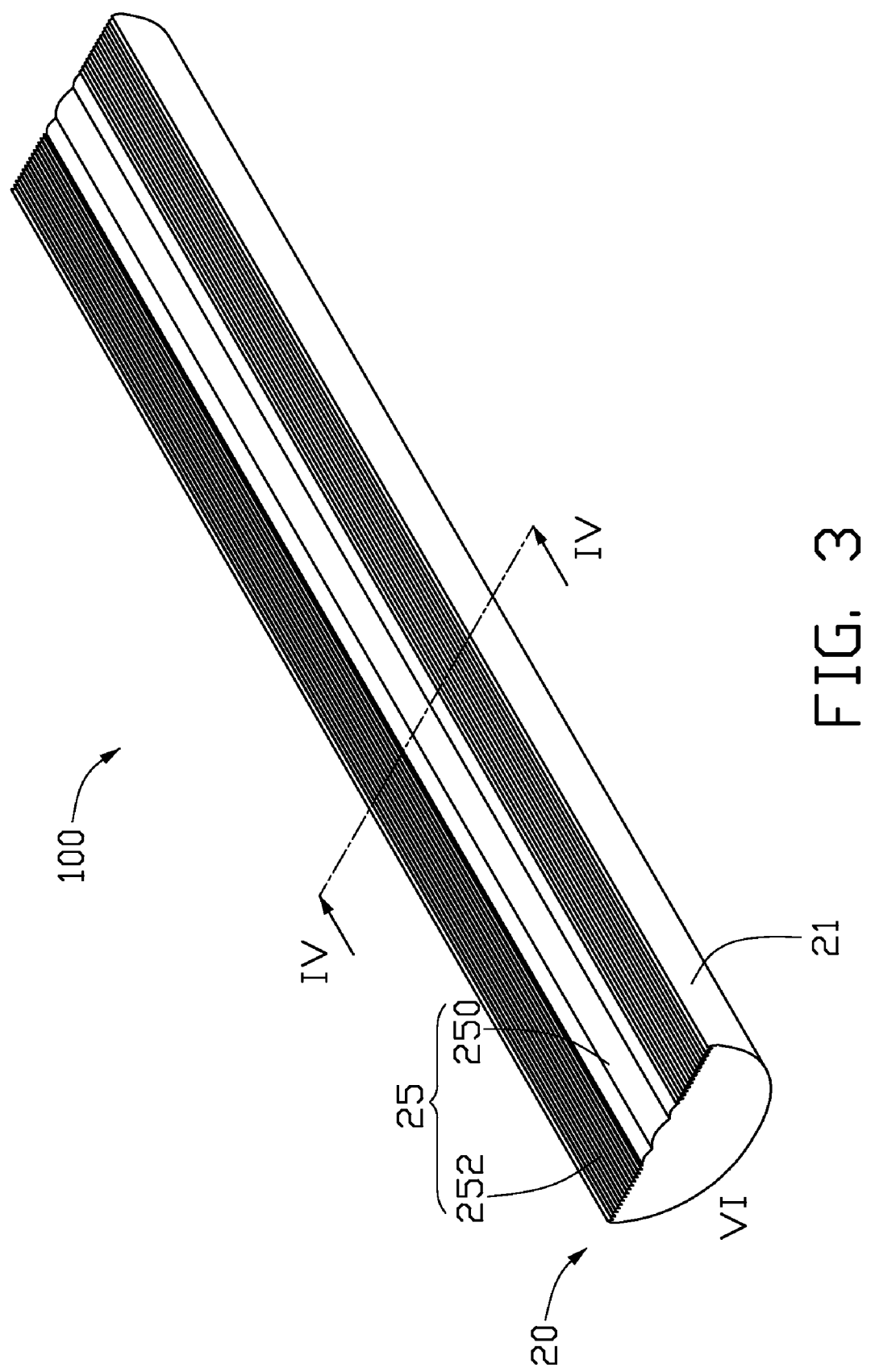
FIG. 3 is another perspective view of the lens array of FIG. 1.
Figure 4:
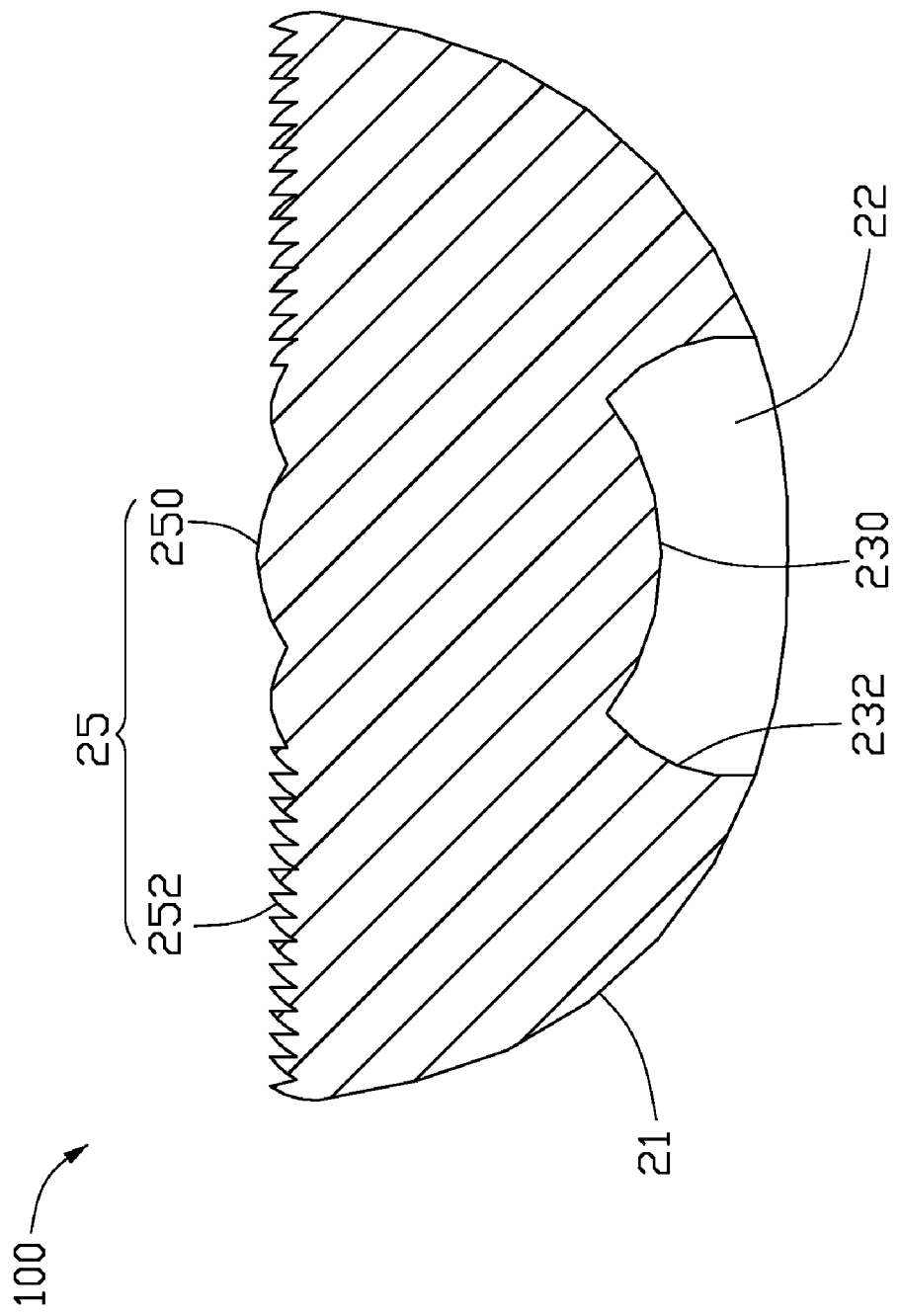
FIG. 4 is a cross-sectional view of the lens array of FIG. 2 taken along the line IV-IV thereof.

Embodiments will now be described in detail below with reference to the drawings.

Referring to FIGS. 1-4, a lens array 100 according to a first embodiment is shown. The lens array 100 includes a plurality of lenses 20 arranged along a longitudinal axis L thereof. The lens array 100 can be made of polymethyl methacrylate (PMMA).

The lens 20 includes a reflecting surface 21, a first light incident surface 230, a second light incident surface 232, and a light emitting surface 25.

The reflecting surface 21 is a convex cylindrical surface extending along the longitudinal axis L of the lens array 100. The reflecting surface 21 is connected between the second light incident surface 232 and the light emitting surface 25.

The first light incident surface 230 is a convex surface extending in a direction of the longitudinal axis L of the lens array 100. The second light incident surface 232 includes two opposite concave surfaces 232A extending along the longitudinal axis L of the lens array 100 and two opposite flat surfaces 232B perpendicular to the longitudinal axis L of the lens array 100. The first light incident surface 230, the concave surfaces 232A and the flat surfaces 232B cooperatively define a receiving space 22. The receiving space 22 is for accommodating a point light source (not shown).

The light emitting surface 25 includes a first light emitting surface 250 and two second light emitting surfaces 252. The first light emitting surface 250 is opposite to the first light incident surface 230. The two second light emitting surfaces 252 are arranged in two opposite sides of the first light emitting surfaces 250. In the present embodiment, the first light emitting surface 250 includes three interconnected aspherical surfaces (not labeled). Each aspherical surface extends along the longitudinal axis L of the lens array 100. The lens array 100 further includes a plurality of Fresnel lens structure (not labeled) formed on the two second light emitting surfaces 252. In the present embodiment, the Fresnel lens structure includes a plurality of sawtooth structures extending along the longitudinal axis L of the lens array 100.

Figure 5:
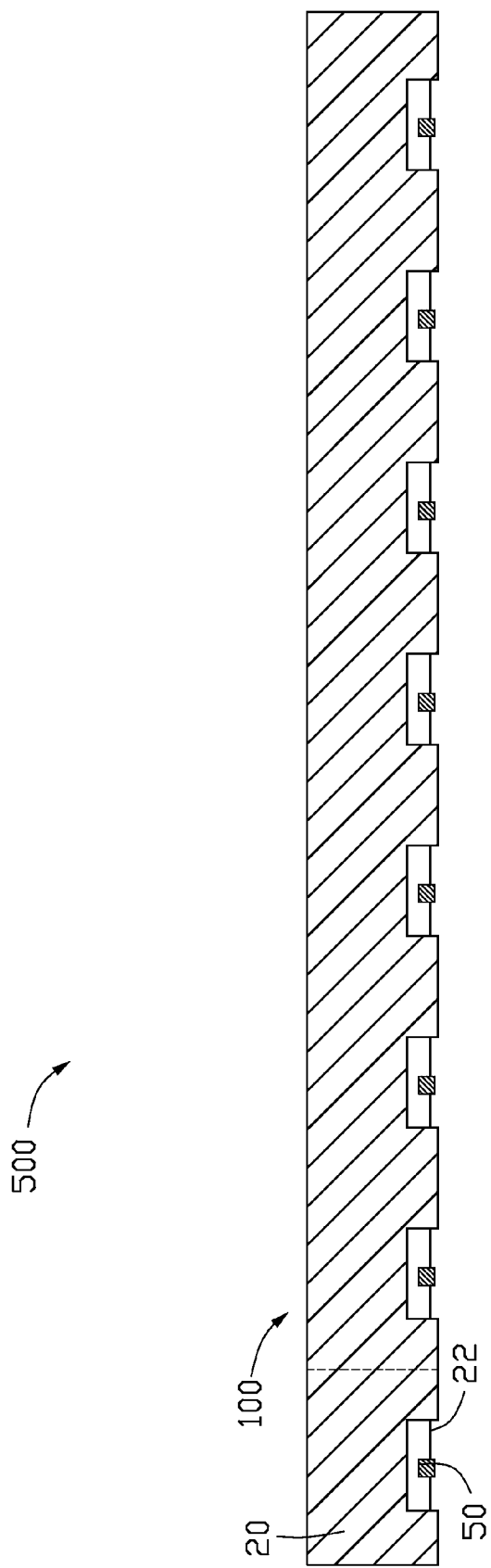
FIG. 5 is a cross-sectional view of a light source module according to a second embodiment with the lens array of FIG. 1.
Figure 6:
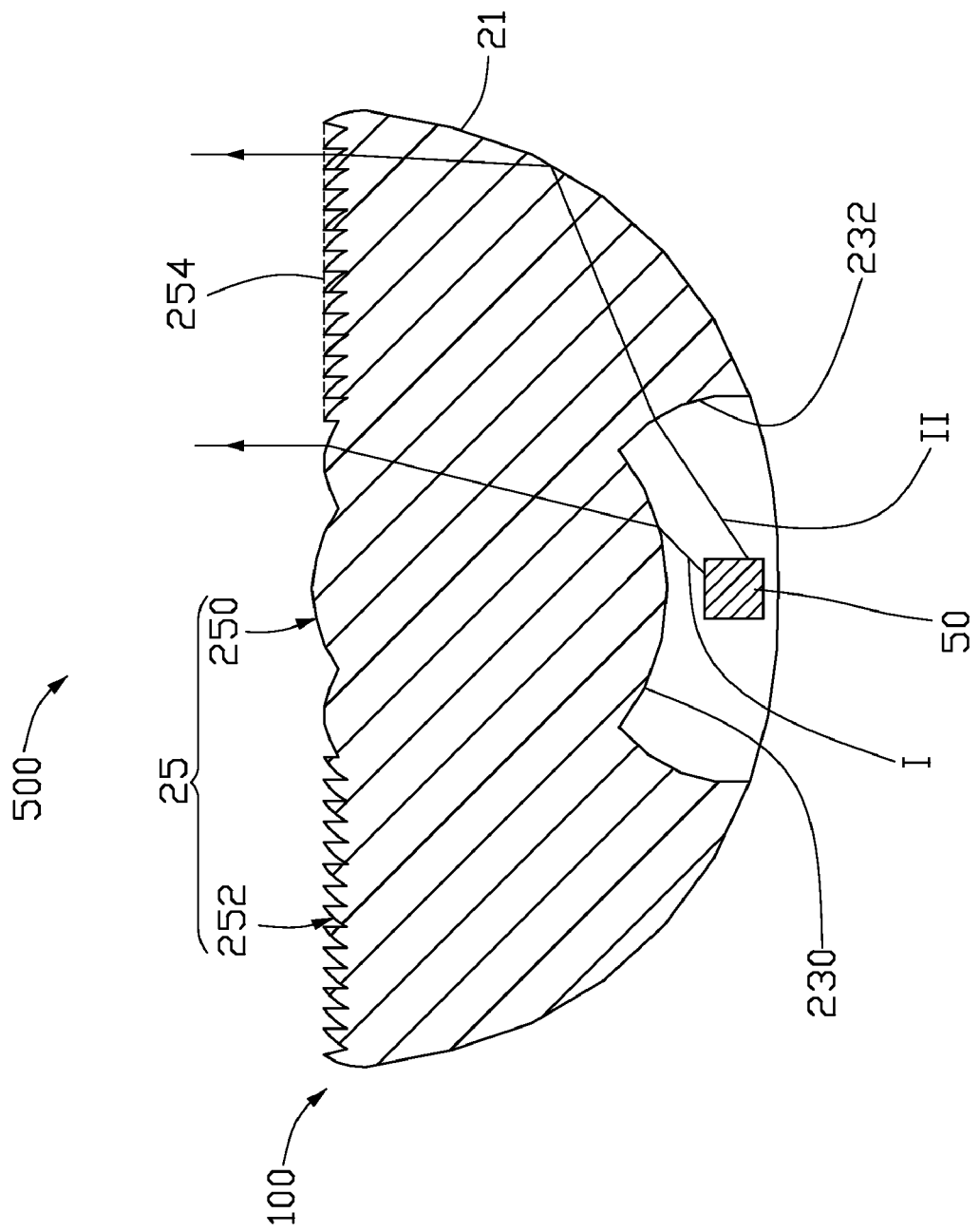
FIG. 6 is a schematic light path view of the light source module of FIG. 5.

Referring to FIGS. 5-6, a light source module 500 according to a second embodiment is shown. The light source module 500 includes the lens array 100 of the first embodiment shown in FIGS. 1-4, and a plurality of point light sources, e.g., light emitting diodes (LEDs) 50. Each LED 50 is disposed in a corresponding receiving space 22 of the lens array 100.

In use, the LED 50 emits light beams I, II towards the lens array 100. The light beam I entering the lens array 100 through the first light incident surface 230 exits from the first light emitting surface 250. The light beam II entering the lens array 100 through the second light incident surface 232 is totally internally reflected from the reflecting surface 21 to the second light emitting surface 252 to exit the lens array 100. In this way, the light beam II is deflected by the reflecting surface 21 in a direction substantially perpendicular to an imaginary surface 254 connected peaks of the sawtooth structures. It is to be understood that many light beams similar to the light beam II are reflected by the reflecting surface 21. Accordingly, brightness of the second light emitting surface 252 is increased, and, therefore, brightness difference between the first light emitting surface 250 and the second light emitting surface 252 is reduced. As a result, the brightness of the first light emitting surface 250 and the second light emitting surface 252 is uniform.

Figure 7:
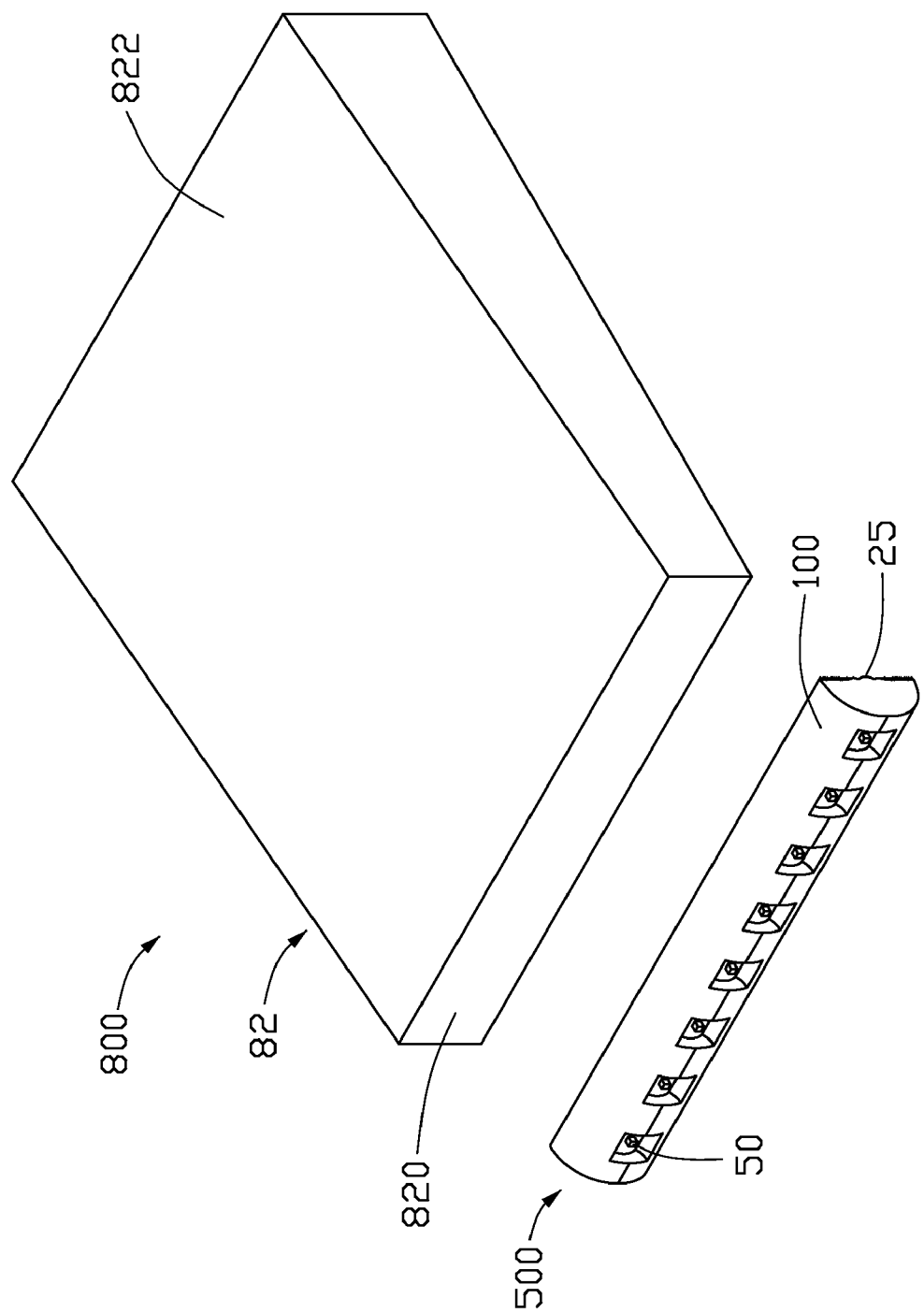
FIG. 7 is an isometric view of a backlight module according to a third embodiment having the light source module of FIG. 5.

Referring to FIG. 7, a backlight module 800 in accordance with a third embodiment is shown. The backlight module 800 includes a light source module 500 according to the second embodiment, and a light guide plate 800. The light guide plate 800 includes a light incident surface 820 and a light emitting surface 822 connected with the light incident surface 820. The light source module 500 is adjacent to the light incident surface 820.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A lens array being substantially a part of a cylinder, the lens array comprising a longitudinal axis and a cylindrical surface extending along the longitudinal axis, the lens array defining a plurality of groove-shaped spaces in the cylindrical surface and arranged along the longitudinal axis, the lens array comprising a plurality of lenses arranged along the longitudinal axis, each of the plurality of lenses having a corresponding one of the groove-shaped spaces and being for coupling with a point light source in the corresponding groove-shaped space, each lens comprising:
- a first light incident surface at a bottom of the corresponding groove-shaped space;
- a second light incident surface at a sidewall of the corresponding groove-shaped space and connected with the first light incident surface;
- a reflecting surface which is a part of the cylindrical surface and connected with the second light emitting surface;
- a first light emitting surface at a bottom of the part of the cylinder and directly opposite to the first light incident surface, wherein light entering the lens through the first light incident surface exits from the first light emitting surface; and
- a second light emitting surface also at the bottom of the part of the cylinder and connected between the first light emitting surface and the reflecting surface, wherein light entering the lens through second light incident surface is reflected by the reflecting surface and directed to the second light emitting surface to exit the lens.

2. The lens array of claim 1, wherein each lens further comprises a Fresnel lens structure formed on its second light emitting surface.

3. The lens array of claim 2, wherein each Fresnel lens structure comprises a plurality of sawtooth structures.

4. The lens array of claim 1, wherein each second light incident surface is a concave surface.

5. The lens array of claim 1, wherein each first light incident surface is a convex surface.

6. The lens array of claim 1, wherein each first light emitting surface comprises a convex cylindrical surface extending along the longitudinal axis.

7. The lens array of claim 1, wherein each reflecting surface is configured for reflecting light by total internal reflection.

8. A light source module, comprising:
- a plurality of point light sources for emitting light;
- a lens array being substantially a part of a cylinder, the lens array comprising a longitudinal axis and a cylindrical surface extending along the longitudinal axis, the lens array defining a plurality of groove-shaped space in the cylindrical surface and arranged along the longitudinal axis, the lens array comprising a plurality of lenses arranged along the longitudinal axis, each of the plurality of lenses having a corresponding one of the groove-shaped spaces and being for coupling with a corresponding point light source in the corresponding groove-shaped space, each lens comprising:
  - a first light incident surface at a bottom of the corresponding groove-shaped space;
  - a second light incident surface at a sidewall of the corresponding groove-shaped space and connected with the first light incident surface;
  - a reflecting surface which is a part of the cylindrical surface and connected with the second light emitting surface;
  - a first light emitting surface at a bottom of the part of the cylinder and directly opposite to the first light incident surface, wherein light entering the lens through the first light incident surface exits from the first light emitting surface; and
  - a second light emitting surface also at the bottom of the part of the cylinder and connected between the first light emitting surface and the reflecting surface, wherein light entering the lens through second light incident surface is reflected by the reflecting surface and directed to the second light emitting surface to exit the lens.

9. A lens array being substantially half of a cylinder, the lens array having a longitudinal axis and comprising a plurality of lenses arranged along the longitudinal axis and integrally formed with each other, each of the lenses comprising:
- a reflecting surface which is a substantially semi-cylindrical surface;
- a first light emitting surface;
- two second light emitting surfaces, each of the two second light emitting surfaces connected between the first light emitting surface and the reflecting surface;
- wherein each of the lenses defines a groove-shaped space in the reflecting surface, the groove-shaped spaces of all the lenses are arranged in a line parallel to the longitudinal axis, each of the lenses further comprises:
- a first light incident surface at a bottom of a corresponding groove-shaped space and opposite to the first light emitting surface; and
- a second light incident surface at a sidewall of the corresponding groove-shaped space and connected with the first light incident surface.

\* \* \* \* \*